US012690951B2

(12) United States Patent
Gallego et al.

(10) Patent No.: US 12,690,951 B2
(45) Date of Patent: Jul. 28, 2026

(54) DENTAL IMPLANTOLOGY USING SPHERICAL COMPONENTS

(71) Applicant: Jean Welingthon Kraft Gallego, Curitiba (BR)

(72) Inventors: Jean Welingthon Kraft Gallego, Curitiba (BR); Fábio Augusto Da Silva, Curitiba (BR)

(73) Assignee: Jean Welingthon Kraft Gallego, Curitiba (BR)

( * ) Notice: Subject to any disclaimer, the term of this patent is extended or adjusted under 35 U.S.C. 154(b) by 467 days.

(21) Appl. No.: 17/632,696

(22) PCT Filed: Jun. 1, 2021

(86) PCT No.: PCT/BR2021/050238
§ 371 (c)(1),
(2) Date: Feb. 3, 2022

(87) PCT Pub. No.: WO2021/243430
PCT Pub. Date: Dec. 9, 2021

(65) Prior Publication Data
US 2022/0280268 A1 Sep. 8, 2022

(30) Foreign Application Priority Data
Jun. 2, 2020 (BR) ...................... 20 2020 011065 4

(51) Int. Cl.
*A61C 8/00* (2006.01)

(52) U.S. Cl.
CPC .......... *A61C 8/0053* (2013.01); *A61C 8/0012* (2013.01); *A61C 8/0022* (2013.01); *A61C 8/0074* (2013.01)

(58) Field of Classification Search
CPC ... A61C 8/0053; A61C 8/0012; A61C 8/0022; A61C 8/0074; A61C 8/005; A61C 8/0048; A61C 8/00; A61C 8/0018
(Continued)

(56) References Cited

U.S. PATENT DOCUMENTS 4,793,808 A * 12/1988 Kirsch ................. A61C 8/0086
433/201.1
4,907,969 A 3/1990 Ward
(Continued)

FOREIGN PATENT DOCUMENTS

BR MU8803485-2 Y1 9/2010
EP 2647347 A1 10/2013
(Continued)

OTHER PUBLICATIONS

Breysse, Dental Implant, WO 2012123654 A1, Machine translation, (Year: 2012).*
(Continued)

*Primary Examiner* — Eric J Rosen
*Assistant Examiner* — Mirayda A Aponte
(74) *Attorney, Agent, or Firm* — Lloyd J. Wilson; Shumaker, Loop & Kendrick, LLP

(57) ABSTRACT

The present invention has the purpose of forming a new implantodontic system with spherical components, applied to implantology, particularly in fixed and mobile prostheses, aiming not to allow the accumulation of microorganisms that develop peri-implantitis and not compromising the osseointegration of the implant, produced in titanium metal and/or surgical stainless steel, which together form this new dental system with excellent locking and reduction in the retention of microorganisms, improving asepsis and making the development of infections extremely unlikely; consisting of implant or spherical intermediates morse cone (CM) or
(Continued)

spherical intermediates external hexagon (HE) or spherical intermediates internal hexagon (HI) and abutment, bringing advantages of greater prosthesis angle from 0° to 45°, versatility, rigidity in the set, torque and resistance mechanics of the forces existing during chewing.

12 Claims, 9 Drawing Sheets

(58) Field of Classification Search
USPC ...................................... 433/174–176, 201.1
See application file for complete search history.

(56) References Cited

U.S. PATENT DOCUMENTS

| | | | | |
|---|---|---|---|---|
| 5,520,540 | A | 5/1996 | Nardi | |
| 2009/0202962 | A1 | 8/2009 | Mangrane | |
| 2016/0278886 | A1 * | 9/2016 | Greenberg | ........... A61C 8/0019 |

FOREIGN PATENT DOCUMENTS

| | | | |
|---|---|---|---|
| KR | 101065924 B | 9/2011 | |
| WO | WO-2010150188 A1 * | 12/2010 | ........... A61C 8/0053 |
| WO | 2020100106 A2 | 5/2020 | |

OTHER PUBLICATIONS

Thome Geninho, Improvement introduced in an internal torque implant, with connection for use in contra-angle and connection for use in ratchet torque wrench , BR-MU8402444-U, machine translation (Year: 2006).*

* cited by examiner

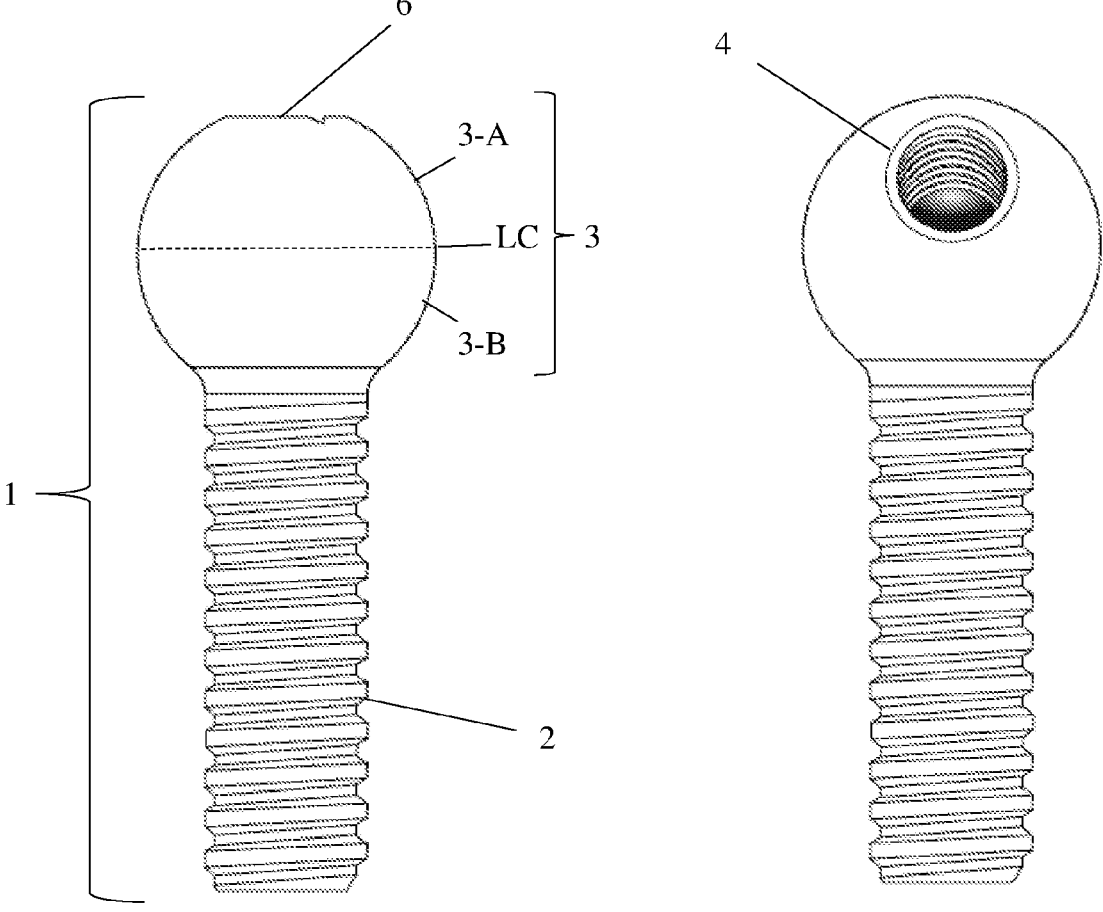
FIG 1.1                                      FIG 1.2

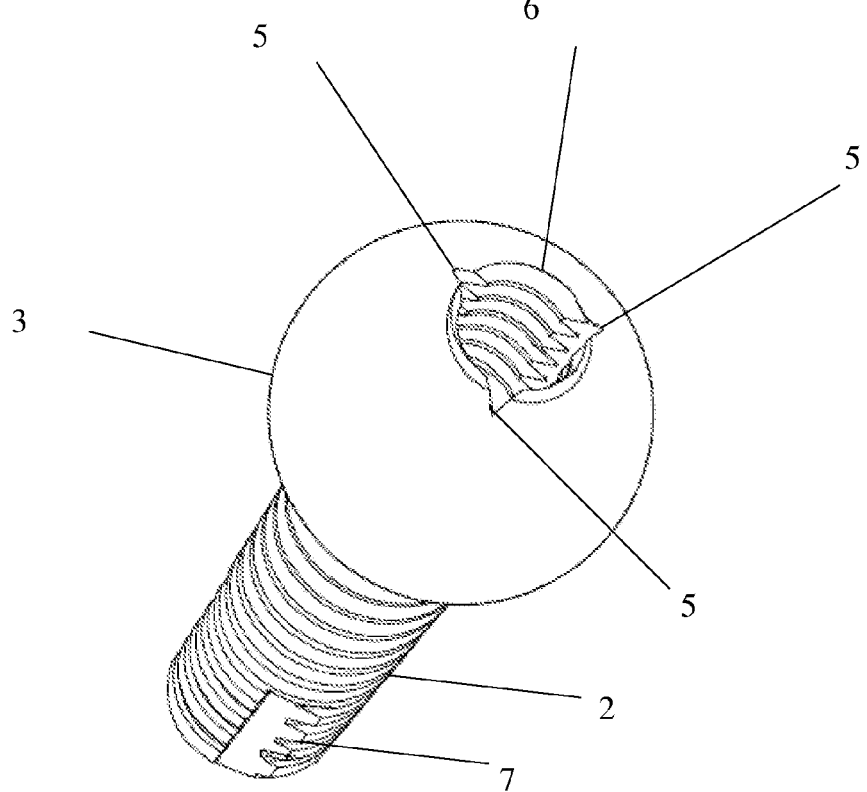
FIG 1.3

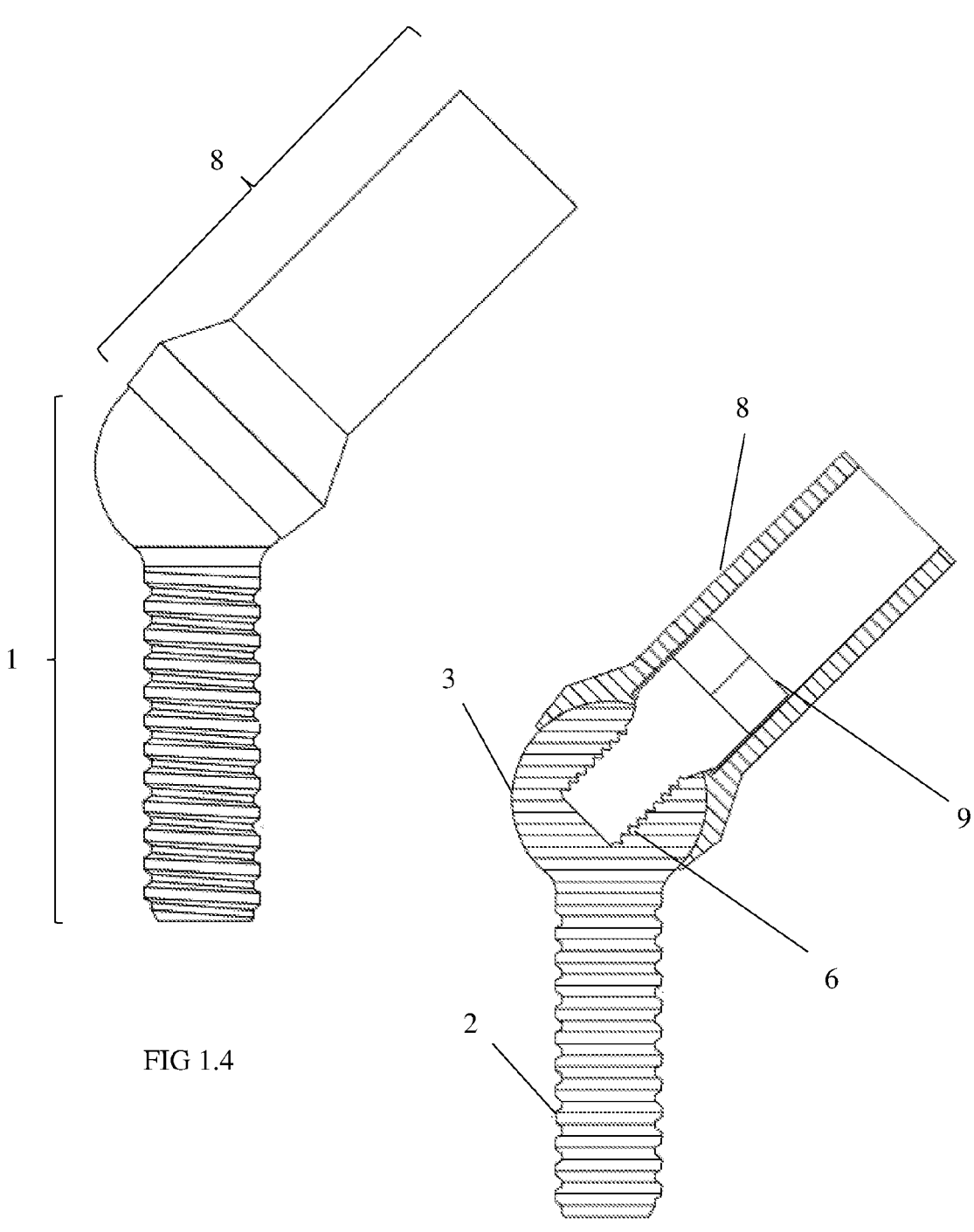
FIG 1.4
FIG 1.5

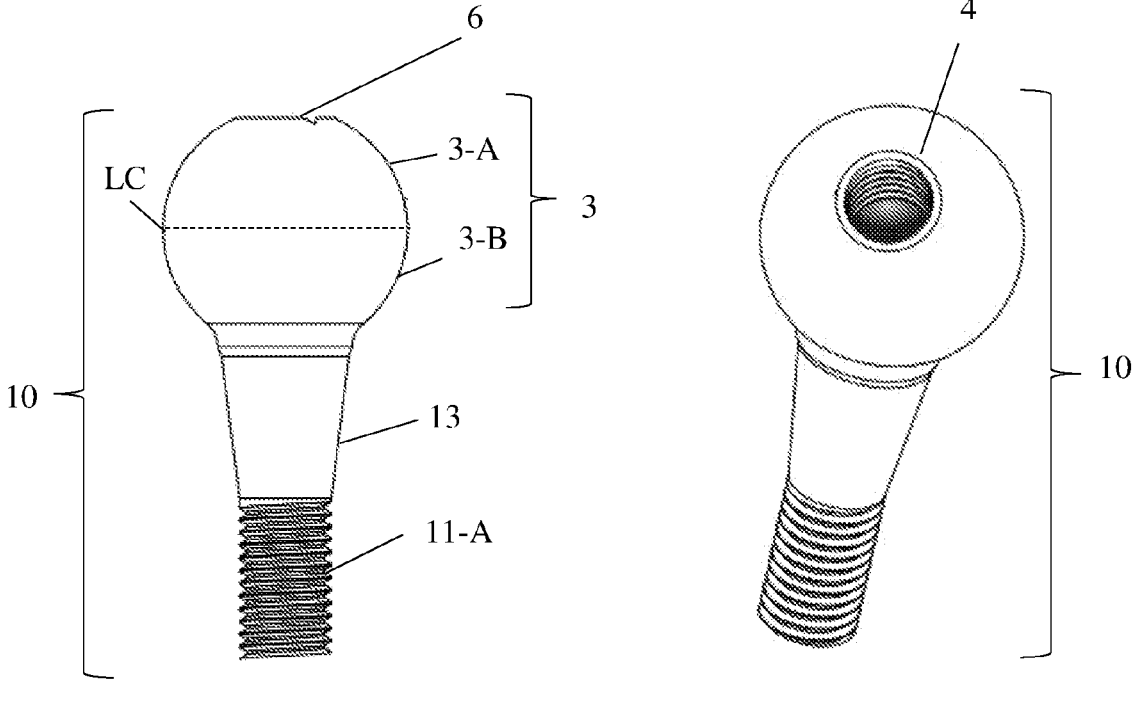
FIG 2.1                                    FIG 2.2

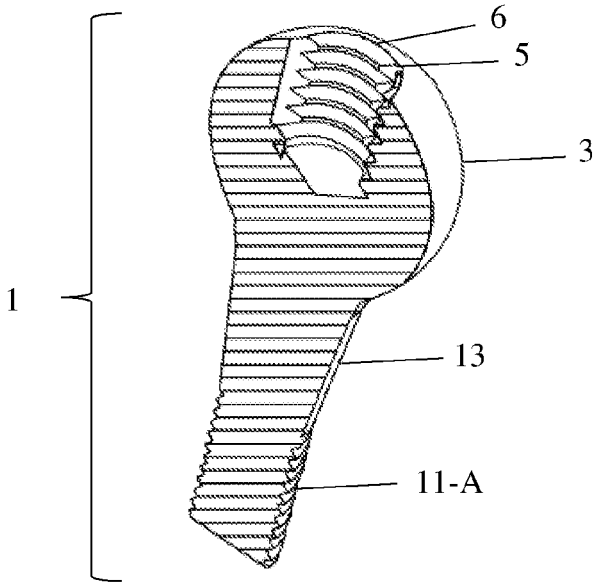
FIG 2.3
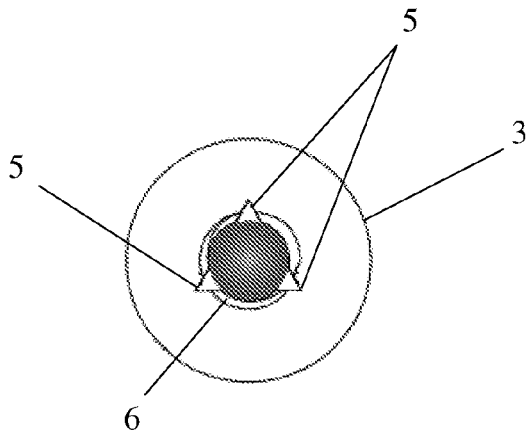
FIG 2.4

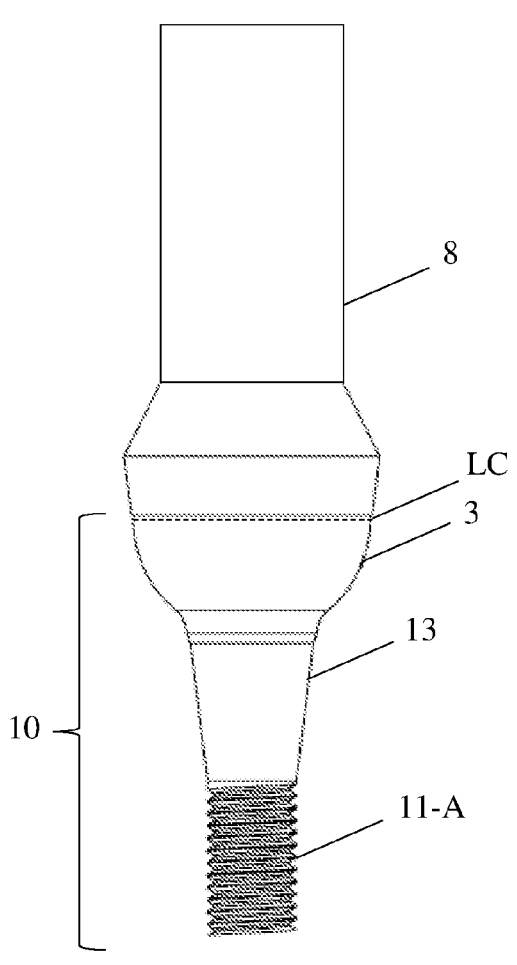
FIG 2.5
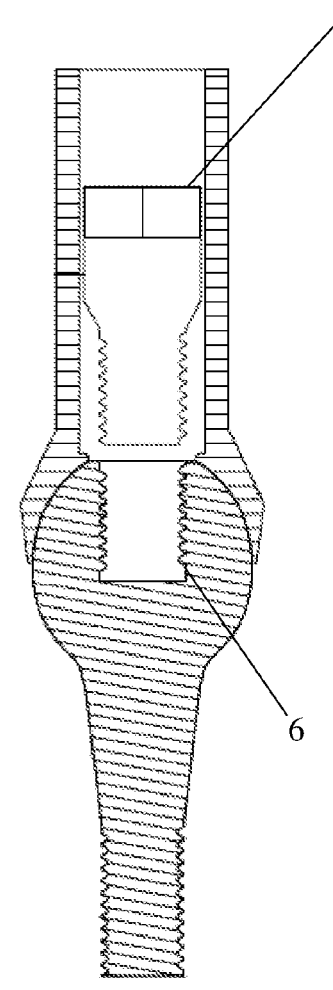
FIG 2.6

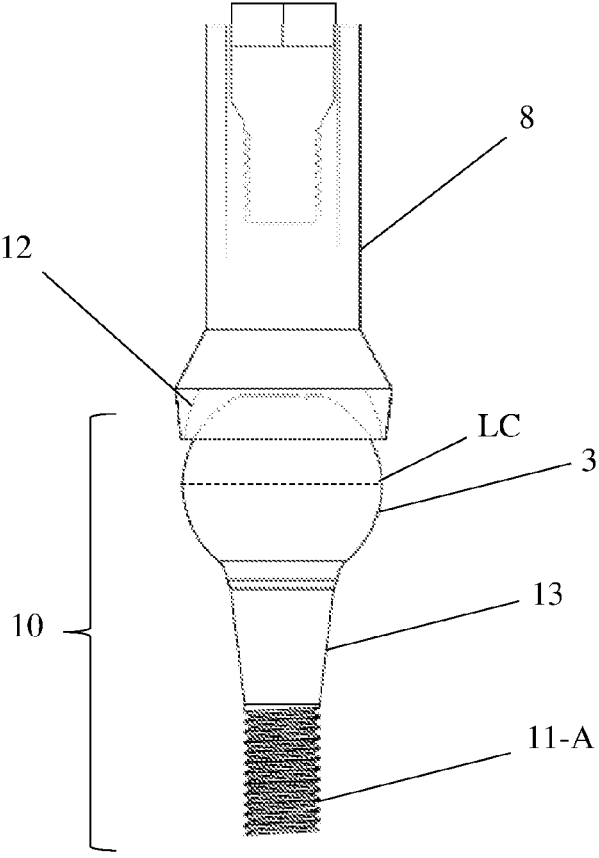
FIG 2.7

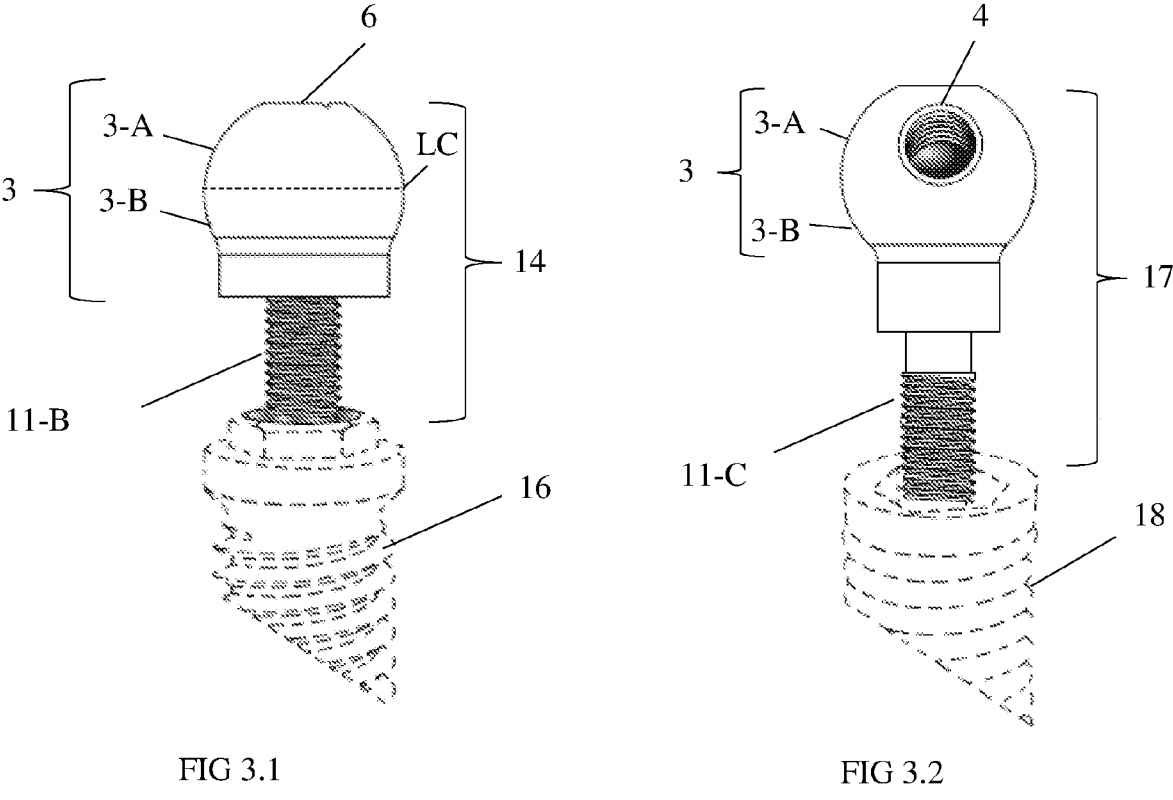
FIG 3.1             FIG 3.2
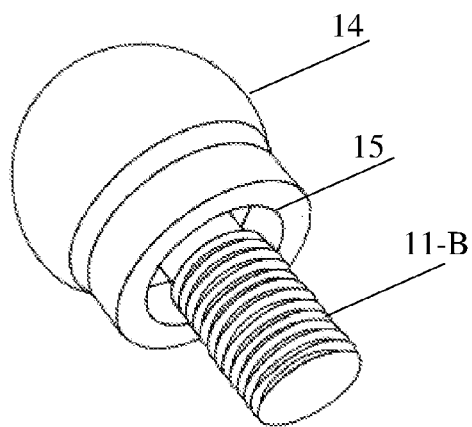
FIG 3.3

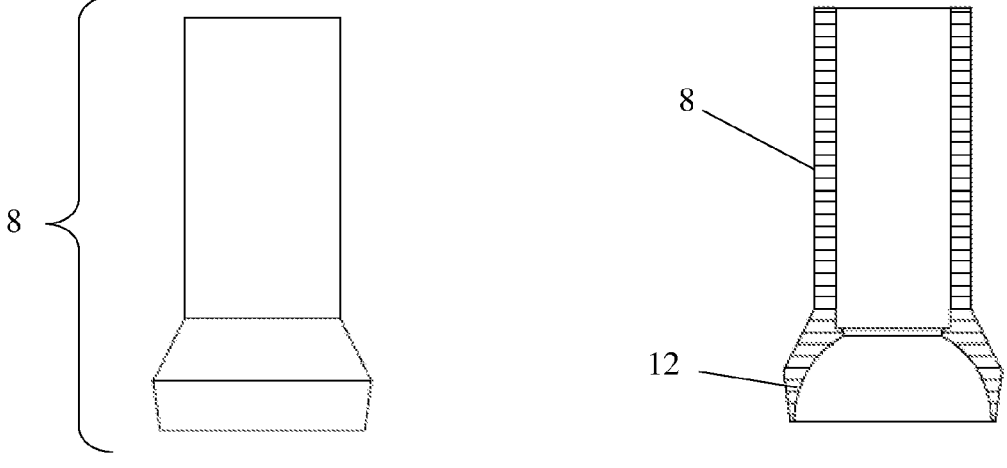
FIG 4.1                    FIG 4.2
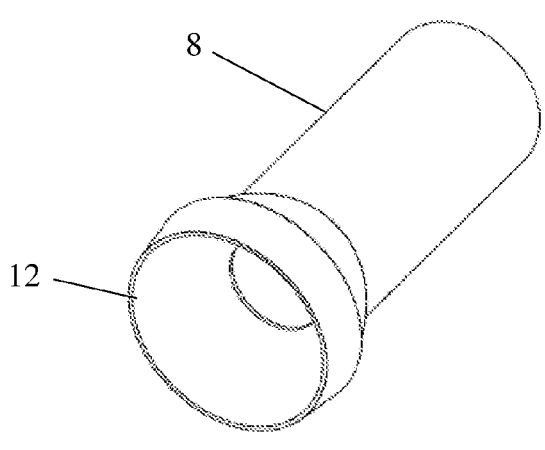
FIG 4.3

DENTAL IMPLANTOLOGY USING SPHERICAL COMPONENTS

CROSS-REFERENCE TO RELATED APPLICATIONS

This application is a United States 371 National Stage Entry tracing priority to and claiming the benefit of Patent Cooperation Treaty (PCT) Application No. PCT/BR2021/050238 filed Jun. 1, 2020, entitled DENTAL IMPLANTOL- OGY USING SPHERICAL COMPONENTS, the entire contents of which are incorporated herein by reference.

FIELD OF THE INVENTION

The Patent application presented herein is intended for dental components with spherical configuration, applied to implantology, particularly in fixed prostheses, with the pur- pose of forming a new set of components produced in titanium metal and/or surgical stainless steel.

BACKGROUND OF THE INVENTION

In recent decades, osseointegrated implants have been commonly used as an alternative for functional esthetic rehabilitation of spaces devoid of teeth.

With the improvement of surgical techniques, the mate- rials used and the surgeons themselves, implants became the first therapeutic option for oral rehabilitation, from single, multiple cases and protocols for the entire dental arch. However, although the success rate is high, implants can present peri-implant infections, which are often not detected in in-office epidemiological surveys.

Peri-implantitis is an inflammatory process caused by bacteria, fungi and other microorganisms, which affect the soft tissue and bone around the dental implant, resulting in loss of the bone that supports the dental implant, causing the loss of the implant.

Other reasons for bone loss after dental implant installa- tion are due to poor installation of currently used abutments, occlusal overload during mastication, and the presence of implant mobility; all these occurrences contribute to the deterioration of the bone structure, causing the loss of the implant.

There are situations in which the patient's bone structure does not support the installation of the implant at the correct angle for fixation of the dental prosthesis, making it neces- sary, therefore, to adjust the installation of the intermediary when it is fitted over the implant, thus creating tiny gaps. There may also occur excessive biomechanical factors on the components that can cause micro-fractures and loosen- ing of fixation screws, all allowing the retention of micro- organisms and the development of peri-implantitis infec- tions, which lead to bone and implant loss.

Angled intermediates used currently only exist with an angle of 17° and 30° in use and support from 1ON to 15N of torque. Those do not have the same load and pressure center as the implant, therefore not obtaining the necessary rigidity to support mastication pressure, resulting in loos- ening of the fixation screw and causing great pressure of the implant against the bone structure.

By searching in international patent databases, the fol- lowing state of the art patents were found:

Brazilian patent BR 112016022951-7 A2 entitled "Fixing system, adapted superstructure, dental implant, and dental implant system", which deals with fixation system, adapted superstructure, dental implant and dental implant system. It describes a fixation system for a dental implant comprising a spherical shaped portion, wherein the fixation system comprises a body having a base forming a cavity. The fastening system is characterized in that the body comprises at least two parts forming the base. The parts are arranged so that the base can engage around the spherical shaped portion of the dental implant and in that the base is movable between a first position in which the parts can move relative to one another, and a second position in which parts are prevented from moving in relation to each other.

Brazilian patent BR 112016022951-7 A2, which describes a threaded locking system for fixation in mobile prosthesis, surmounted by a fixed sphere in the mouth, known as an o-ring or overdenture healer, which comprises a two-part body, with a different functionality of the product of this patent application, with the disadvantage of not being hermetically sealed and not having angulation models.

U.S. Pat. No. 5,302,125 entitled "Dental prosthetic implant", which discloses a dental prosthetic implant which has angular rotational capability and improved locking between the implant fixture and the abutment prosthesis. The rotation and locking system includes an implant fixture with an internal spherical radius at its upper portion. A top seat with the same spherical radius is secured to the top portion of the fixture. A locking element configured as a sphere with flexible locking fingers on its lower portion and an internal cylindrical bore through its center that has a conically tapered lower portion is received between the implant fixture and the main body of the abutment. The conically tapered lower portion may taper inwardly or outwardly and is engaged by a similarly configured portion of the flexible fingers. A threaded portion of the locking screw engages in a threaded bore in the implant providing the force to bias the flexible fingers outwardly into firm engagement with a complementarily configured surface on the fixture, as well as increasing the pressure between the upper surface of the locking element and the nether surface of the top seat.

U.S. Pat. No. 5,302,125, which describes a dental pros- thetic implant which has angular rotational capability and improved locking between the implant fixture and the abut- ment prosthesis. The rotation and locking system includes an implant fixture with an internal spherical radius at its upper portion. A top seat with the same spherical radius is secured to the top portion of the fixture. A locking element config- ured as a sphere with flexible locking fingers on its lower portion and an internal cylindrical bore through its center that has a conically tapered lower portion is received between the implant fixture and the main body of the abutment. The conically tapered lower portion may taper inwardly or outwardly and is engaged by a similarly con- figured portion of the flexible fingers. A threaded portion of the locking screw engages in a threaded bore in the implant providing the force to bias the flexible fingers outwardly into firm engagement with a complementarily configured surface on the fixture, as well as increasing the pressure between the upper surface of the locking element and the nether surface of the top seat.

European Patent EP0288702A2, entitled "improved sub- mergible screw-type dental implant and method of utiliza- tion", which discloses a submergible screw-type implant includes a longitudinal channel which directs bone chips towards the base of a bore in the patient's bone in which the implant is installed. These bone chips promote autogenous rapid regrowth of new bone to securely anchor the implant in place. In order to be able to position the implant at the most advantageous angle at the edentulous sight, angled abutments for supporting an artificial tooth structure or angularly adjustable abutments are provided. The angularly adjustable abutments may be in the form of a ball and socket joint in which the socket includes an inner casing having a peripheral extension that acts to lock the joint at the desired angle. Also, the support for an artificial tooth may include a shock-absorbing cushion to prevent some of the forces of mastication from disturbing the implant.

European patent EP0288702A2, which describes a submergible screw-type implant) includes a longitudinal channel which directs bone chips towards the base of a bore in the patient's bone in which the implant is installed. These bone chips promote autogenous rapid regrowth of new bone to securely anchor the implant in place. In order to be able to position the implant at the most advantageous angle at the edentulous sight, angled abutments for supporting an artificial tooth structure or angularly adjustable abutments are provided. The angularly adjustable abutments may be in the form of a ball and socket joint in which the socket includes an inner casing having a peripheral extension that acts to lock the joint at the desired angle. Also, the support for an artificial tooth may include a shock-absorbing cushion to prevent some of the forces of mastication from disturbing the implant.

The components currently used are of good quality and present an excellent success rate, but they can still be improved with regard to biomechanical actions, contamination and peri-implant inflammation, which can culminate in the total loss of the implant.

BRIEF SUMMARY OF THE INVENTION

Dental implantology using with spherical components comprising an implant with a spherical upper part, solid, rigid, in a single body and manufactured in titanium and/or surgical stainless steel, topped by a spherical part containing an spherical upper part above the center line and with hole with 0° thread or hole with thread up to 45° and fitting for triangular wrench located in the hole with 0° thread or the hole with thread up to 45°, and a lower part of spherical or variable shape according to the shape and height of the patient's gums below the center line, and at the bottom the thread of the implant with lock, for fixation in the bone structure and with full sealing joint at the top through UCLA with concave fitting at its bottom.

Dental implantology using with spherical components, characterized by a CM spherical intermediate manufactured in titanium and/or surgical stainless steel composed of spherical part containing an upper part of spherical shape above the center line and with hole with 0° thread or hole with thread up to 45° and fitting for triangular wrench located in the hole with 0° thread or hole with thread up to 45°, and a lower part of spherical or variable shape according to the shape and height of the patient's gums below the line of center, and in the lower part, CM lower thread of the morse cone type and with full sealing joint in the upper part through UCLA with concave fitting at its bottom.

Dental implantology using with spherical components, characterized by spherical intermediate HE manufactured in titanium and/or surgical stainless steel composed of a spherical part containing an upper part spherical in shape above the center line and with 0° thread hole or hole with thread up to 45° and fitting for triangular wrench located in the 0° thread hole or hole with thread up to 45°, and a lower part of spherical or variable shape according to the shape and height of the patient's gums below the center line, and at the bottom of the spherical intermediate HE lower thread HE of the external hexagonal type and with full sealing joint on the upper part through UCLA with a concave fitting at its bottom.

Dental implantology using with spherical components characterized by a spherical intermediate HI manufactured in titanium and/or surgical stainless steel composed of a spherical part containing an upper part spherical in shape above the center line and with 0° thread hole or hole with thread up to 45° and fitting for triangular wrench located in the 0° thread hole or hole with thread up to 45°, and a lower part of spherical or variable shape according to the shape and height of the patient's gums below the center line, and in the lower part, HI internal hexagonal lower thread and with full sealing joint at the top through UCLA with concave fitting at its bottom.

Installation process of dental implantology using spherical components, characterized by the following sequence: a) Before the application of implants or spherical intermediates in the mouth, the angulation of the spherical part from 0 to 45° is defined according to the clinical need of each patient; b) The implant is threaded with a spherical upper part, more specifically the implant thread, into the patient's bone or CM spherical intermediate, more specifically CM lower thread, inside the morse cone implant, or HE spherical intermediate, more specifically the HE bottom thread (11-B), inside the HE implant (16), or HI spherical intermediate, more specifically the HI bottom thread, inside the HI implant; and c) The screw is screwed fixing the 0° thread or thread up to 45° to the UCLA of the implant with spherical upper part (1) or spherical intermediates CM or HE or HI.

BRIEF DESCRIPTION OF THE DRAWINGS

The drawings illustrate embodiments of the invention.

FIG. 1.1 is a front view of an embodiment of an implant of the present invention.

FIG. 1.2 is a front view of an embodiment of an implant of the present invention with a spherical top.

FIG. 1.3 is a top perspective view of an embodiment of an implant of the present invention with a spherical top.

FIG. 1.4 is a top perspective view of an embodiment of an implant system of the present invention that includes an implant with a spherical top in communication with a UCLA.

FIG. 1.5 is a cross-sectional view of the implant system of FIG. 1.4.

FIG. 2.1 is a front view of an embodiment of a morse cone (CM) spherical intermediate.

FIG. 2.2 is a top perspective view of an embodiment of a CM spherical intermediate.

FIG. 2.3 is a top perspective cross-sectional view of an embodiment of a CM spherical intermediate.

FIG. 2.4 is a top view of an embodiment of a CM spherical intermediate.

FIG. 2.5 is a front view of an embodiment of an implant system that includes a CM spherical intermediate in communication with a UCLA.

FIG. 2.6 is a front cross-sectional view of the implant system of FIG. 2.5.

FIG. 2.7 is a partially exploded front view of the implant system of FIG. 2.5.

FIG. 3.1 is a front view of an embodiment of an implant system that includes an external hexagon (HE) spherical intermediate.

FIG. 3.2 is a front view of an embodiment of an implant system that includes an internal hexagon (HI) spherical intermediate.

FIG. 3.3 is a bottom perspective view of an embodiment of an HE spherical intermediate.

FIG. 4.1 is a front view of an embodiment of a UCLA.

FIG. 4.2 is a cross-sectional view of the embodiment of the UCLA of FIG. 4.1.

FIG. 4.3 is a bottom perspective view of an embodiment of a UCLA.

DETAILED DESCRIPTION OF THE INVENTION

The present invention refers to a set of metallic components that have the purpose of forming an implantodontic system with hermetic locking of the UCLA (8) on an implant (1) with a spherical upper part (3) and in the lower part of the thread (2) of the implant to fixation on the bone structure. Alternatively, in the lower part, the implantodontic system can replace the implant (1) with spherical upper part by spherical intermediates (10) morse cone (CM), spherical intermediates (14) external hexagon (HE) or spherical intermediates (17) internal hexagon (HI), and the locking of these over an implant (freely purchased in the market), either with fixed, single or multiple dental prostheses.

This patent application covers components with spherical parts, which are: implant (1) with spherical upper part (3) solid, rigid and in a single body, spherical intermediates CM (10), spherical intermediates HE (14), spherical intermediates HI (17) and UCLA (8), all produced with titanium metal and/or surgical stainless steel.

Spherical intermediates CM (10), spherical intermediates HE (14) and spherical intermediates HI (17) are produced in versions with straight or angled threads, these being from 0° (zero degree) (6) and up to 45° (forty-five degrees) (4), having the 0° thread (6) at the top (3-A), vertical positioning following the alignment of the pre-installed implant; the other angles are diagonally positioned.

In straight or angled threads, from 0° (6) and up to 45° (4), this is where the UCLA (8) is fixed using a screw (9).

The 0° thread (6) is combined with a triangular wrench fitting (5) which is used exclusively to screw the implant (1) with a spherical top (3), solid, rigid and in a single body, in the mandible or maxillary bone of the patient; in the same way, it serves to screw all spherical intermediates CM (10), spherical intermediates HE (14) and spherical intermediates HI (17) with 0° (6) thread, these using any implant purchased in the dental market.

Spherical intermediates CM (10), spherical intermediates HE (14) and spherical intermediates HI (17), naturally convex in shape, can be used in any implant model found in the dental market, but it is essential to use the UCLA (8) with concave fitting (12), innovation and novelty that provide superior quality to implant dentistry.

The spherical intermediates CM (10), spherical intermediates HE (14) and spherical intermediates HI (17) were designed and developed to, when installed in implants purchased in the dental market, have a fully sealing joint, forming the so-called "cold solder" that does not allow accumulation of microorganisms, since it allows threading in the screw (9) with pressure up to 32N (Newtons), because from this pressure there is a risk of threading of the implant already implanted.

The term "cold solder" is used when the "two-piece joint" presents a perfect joint as if there had been a conventional solder.

The implant (1) with a spherical upper part (3), solid, rigid and in a single body, is also produced with threads from 0° (6) to 45° (4), with the same characteristics as the spherical intermediates CM (10), spherical intermediates HE (14) and spherical intermediates HI (17). This component, which comprises two parts in a single body, has the great advantages of not having seams, eliminating angular sealing and biomechanical platform problems, and does not allow retention of microorganisms, which could develop peri-implantitis and compromise the osseointegration of the implant, promoting its total loss.

With different angles, from 0° to 45°, the spherical intermediates CM (10), spherical intermediates HE (14) and spherical intermediates HI (17) and the implant (1) with a spherical top (3) allow more and better options for the surgical planning of the patient by the dentist.

The UCLA (8) is produced in a single format with a concave fit (12), for locking the spherical intermediates CM (10), spherical intermediates HE (14) and spherical intermediates HI (17) and the implant (1) with a spherical upper part (3), all convex.

When the UCLA (8) is fixed by screw (9) to the spherical intermediates CM (10), spherical intermediates HE (14) and spherical intermediates HI (17), or to the implant (1) with a spherical top (3), the center of these two components becomes coincident (as shown in FIGS. 1.4 and 2.5). Therefore, there will be a single pressure point focusing on the implant, not forcing it to be mobile. This provides greater rigidity in the set, better screw torque for the screw (9), allowing greater pressure, better quality in the threading and fixation between them, providing excellent mechanical resistance to the forces applied during mastication.

This set of components, as they offer very high quality fittings, eliminates any correction adjustments made by the dentist, allowing the UCLA (8) with the dental prosthesis to be well fixed, not creating spaces where there would be retention of microorganisms, with losses for the implantodontic set, in particular the loss of the implant due to problems in the bone structure that would culminate in the total loss of the prosthesis.

Next, the drawings will be detailed for a better understanding of the benefits and uniqueness of the parts contained in this patent application.

FIG. 1.1—which shows the front view of the implant (1) with a spherical upper part (3), solid, rigid, in a single body and manufactured in titanium and/or surgical stainless steel, surmounted by the spherical upper part (3) containing an upper part (3-A) of spherical shape above the center line (LC), imaginary, and with a 0° thread hole (6) where the UCLA (8) will be fixed, and a lower part (3-B) of spherical or variable shape according to the shape and height of the patient's gum below the center line (LC), imaginary, and at the bottom the implant thread (2) for fixation on the bone structure. 8:1 scale.

FIG. 1.2—which shows the front view of the implant (1) with a spherical upper part (3), solid, rigid, in a single body and manufactured in titanium and/or surgical stainless steel, surmounted by the spherical upper part (3) containing an upper part (3-A) of spherical shape above the center line (LC), imaginary, and with a threaded hole up to 45° (4) where the UCLA (8) will be fixed, and a lower part (3-B) of spherical or variable shape according to the shape and height of the patient's gums below the imaginary center line (LC), and at the bottom the implant thread (2) for fixation on the bone structure. 8:1 scale.

FIG. 1.3—showing the top perspective view of the implant (1) with spherical upper part (3) solid, rigid and in a single body, surmounted by the spherical upper part (3), shows a triangular key fitting (5) together with the 0° thread (6) where the UCLA (8) will be fixed with the dental prosthesis, the lock (7) and the thread (2) of the implant (1). No scale.

FIG. 1.4—showing the top perspective view of the implant (1) with spherical upper part (3), solid, rigid and in a single body, surmounted by the spherical upper part (3), where the UCLA (8) is installed, fixed to the thread up to 45° (4) through screw (9) and the thread (2) of the implant. 8:1 scale.

FIG. 1.5—which shows the front view of the implant (1) with longitudinal section; implant (1) with spherical upper part (3), solid, rigid and in a single body, surmounted by the spherical upper part (3), where the UCLA (8) is installed, fixed to the thread up to 45° (4) through screw (9) and the thread (2) of the implant (1). 8:1 scale.

FIG. 2.1—which shows the front view of the CM spherical intermediate (10); CM spherical intermediate (10) composed of a spherical part (3) containing an upper part (3-A) of spherical shape above the centerline (LC), imaginary, and with a 0° threaded hole (6), and a lower part (3-B) spherical or variable in shape according to the shape and height of the patient's gums below the imaginary center line (LC) and in the lower part CM lower thread (11-A) of the standard morse cone type of market, and CM lock (13). 8:1 scale.

FIG. 2.2—which shows the front perspective view of the CM spherical intermediate (10); CM spherical intermediate (10) composed of a spherical part (3) with thread indicative up to 45° (4), with lower thread (11) and CM locking (13), for fixation in implant with morse taper standard locking, found in the market. 8:1 scale.

FIG. 2.3—which shows the front perspective view of the spherical intermediate CM (10) in longitudinal section; CM spherical intermediate (10), indicating the lower thread (11), the triangular key fitting (5) together with the 0° thread (6), spherical part (3) and CM locking (13). No scale.

FIG. 2.4—which shows the top view of the CM spherical intermediate (10); CM spherical intermediate (10) with triangular key socket (5) together with 0° thread (6). 8:1 scale.

FIG. 2.5—which shows the front view of the CM spherical intermediate (10) and the UCLA (8); CM spherical intermediate (10) with the lower thread (11) and the CM locking (13) joined to the UCLA (8) in its spherical part (3). 8:1 scale.

FIG. 2.6—which shows the front view of the front view of the CM spherical intermediate (10) and the UCLA (8) in longitudinal section; CM spherical intermediate (10), joined to the UCLA (8) in its spherical part (3) by screw (9); and the lower thread (11) and the CM locking (13). 8:1 scale.

FIG. 2.7—which shows the front view of the CM spherical intermediate (10), joined to the UCLA (8) in its spherical part (3), lower thread (11) and the CM locking (13), highlighting the concave fitting (12) of the UCLA (8). 8:1 scale.

FIG. 3.1—which shows the front view of the spherical intermediate HE (14), with its spherical part (3) containing an upper (3A) of convex shape, above the centerline (LC), imaginary, and a lower (3-B) of variable shape according to the shape and height of the patient's gums, below the imaginary center line (LC), indicating the 0° thread (6) and its spherical intermediate platform HE shows the HE implant platform (16). No scale.

FIG. 3.2—which shows the front view of the spherical intermediate HI (17) with its spherical part (3) containing an upper part (3-A) of convex shape, above the centerline (LC), imaginary, and a lower part (3-B) of variable shape of according to the shape and height of the patient's gums, below the imaginary center line (LC), with the thread up to 45° (4), and the HI implant (18). No scale.

FIG. 3.3—which shows the bottom perspective view of the spherical intermediate HE (14), with the Spherical Intermediate HE Platform (15). No scale.

FIG. 4.1—which shows the front view of UCLA (8). 8:1 scale.

FIG. 4.2—which shows the front view of the UCLA (8) seen in longitudinal section, with an indication of its concave fitting (12). 8:1 scale.

FIG. 4.3—showing the bottom perspective view of UCLA (8) highlighting its concave fitting (12). No scale.

The installation process of the product described in this patent takes place in the following sequence:

Before the application of implants or spherical intermediates in the mouth, the angulation of the spherical part (3) from 0 to 45° is defined according to the clinical need of each patient;

The implant (1) is threaded with a spherical upper part (3) more specifically the implant thread (2) into the patient's bone or CM spherical intermediate (10) more specifically CM lower thread (11-A) inside the morse cone implant, or spherical intermediate HE (14), more specifically the lower thread HE (11-B) inside the HE implant (16), or spherical intermediate HI (17), more specifically the lower thread HI (11-C) inside the HI implant (18); and The screw (9) is screwed, fixing the 0° thread (6) or thread up to 45° (4) to the UCLA (8) of the implant (1) with spherical upper part (3) or spherical intermediates CM (10) or spherical intermediates HE (14) or spherical intermediates HI (17).

The invention claimed is:

1. A dental implant system comprising:
a spherical intermediate that includes a longitudinal axis, the spherical intermediate comprising:
  a spherical part centrally positioned along the longitudinal axis, the spherical part having:
    a semi-spherical upper part located above a transverse axis of the spherical part, the semi-spherical upper part having a threaded hole positioned either (a) coaxially with the longitudinal axis of the spherical intermediate or (b) at an angle up to 45° to the longitudinal axis, the threaded hole including a fitting for a triangular wrench when the threaded hole is positioned coaxially with the longitudinal axis of the spherical intermediate; and
    a semi-spherical lower part located below the transverse axis; and
  a lower thread;
  an external fitting ring that is cylindrically shaped and that defines an interior and is connected to the semi-spherical lower part, the external fitting ring being proximate the lower thread, the interior forming an annular cylinder-shaped volume; and
an implant configured to be coupled with the lower thread of the spherical intermediate, the implant being an external hexagonal implant that is securably attachable to bone structure of a patient's jaw, that implant including a hexagonal connection positioned exterior to an end of the implant;
wherein the annular cylinder-shaped volume is of sufficient volume to accept the hexagonal connection;
wherein the spherical intermediate is manufactured from titanium and/or surgical stainless steel.

2. The dental implant system of claim 1, wherein the system further includes an abutment, wherein the semi-spherical upper part is configured to be affixed to the abutment, the abutment having a concave fit by a screw located within the abutment, wherein the screw is configured to be secured to the threaded hole in the semi-spherical upper part.

3. The dental implant system of claim 2, wherein the semi-spherical upper part is configured to be affixed to the abutment via a hermetic locking mechanism.

4. The dental implant system of claim 3, wherein the hermetic locking mechanism is a cold solder mechanism.

5. The dental implant system of claim 1, wherein the spherical part includes a solid, rigid, single body such that the threaded hole is fixed without secondary articulation.

6. The dental implant system of claim 1, wherein the semi-spherical lower part is spherical or variable in shape according to a shape and height of the patient's gums.

7. A method for installing a dental implant system, the method comprising the following steps:

before application of a dental implant in a mouth of a patient, defining an angulation of a threaded hole of a spherical part according to clinical needs of the patient;

securing the dental implant into the patient's bone struc-ture thereby securing the dental implant, the dental implant being an external hexagonal implant that includes a hexagonal connection positioned exterior to an end of the dental implant;

securing a spherical intermediate at the end of the dental implant, the spherical intermediate including a longi-tudinal axis; the spherical intermediate including:

the spherical part centrally positioned along the longi-tudinal axis, wherein the spherical part includes:

a semi-spherical upper part located above a trans-verse axis of the spherical part, the semi-spherical upper part including the threaded hole and the angulation of the threaded hole is positioned either (a) coaxially with the longitudinal axis of the spherical intermediate or (b) at an angle up to 45° to the longitudinal axis of the spherical interme-diate, the threaded hole including a fitting for a triangular wrench when the threaded hole is posi-tioned coaxially with the longitudinal axis of the spherical intermediate; and a semi-spherical lower part located below the trans-verse axis of the spherical part; and a lower thread; and an external fitting ring that is cylindrically shaped and that defines an interior and is connected to the semi-spherical lower part, the external fitting ring being proximate the lower thread, the interior form-ing an annular cylinder-shaped volume that is suffi-cient to accommodate the hexagonal connection; and affixing an abutment to the semi-spherical upper part of the spherical intermediate, thereby creating a fully sealed joint between the abutment and the semi-spheri-cal upper part, the affixing including screwing a screw located within the abutment into the threaded hole located in the semi-spherical upper part.

8. The method for installing a dental implant system of claim 7, wherein the securing of the spherical intermediate includes securing the external fitting ring to the external hexagonal connection of the dental implant.

9. The method for installing a dental implant system of claim 7, wherein the spherical part includes a solid, rigid, single body such that the threaded hole is fixed.

10. The method for installing a dental implant system of claim 7, wherein the semi-spherical lower part is spherical or variable in shape according to a shape and height of the patient's gums.

11. A dental implant system comprising:

a spherical intermediate that includes a longitudinal axis, the spherical intermediate comprising:

a spherical part centrally positioned along the longitu-dinal axis, the spherical part including:

a semi-spherical upper part located above a trans-verse axis of the spherical part, the semi-spherical upper part having a threaded hole positioned either (a) coaxially with the longitudinal axis of the spherical intermediate or (b) at an angle up to 45° to the longitudinal axis, the threaded hole includ-ing a triangular key socket for a triangular wrench when the threaded hole is positioned coaxially with the longitudinal axis of the spherical inter-mediate; and a semi-spherical lower part located below the trans-verse axis;

a fitting coupled to the semi-spherical lower part, the fitting forming a cylinder; and a lower thread coupled to the fitting such that the fitting is positioned intermediate the semi-spherical lower part and the lower thread; and an implant configured to be coupled with both the lower thread of the spherical intermediate and the fitting of the spherical intermediate, the implant being an internal hexagonal implant that includes a hexagonal connec-tion positioned at an end of the implant, the hexagonal connection forming a hexagonally shaped recess in the end of the implant to receive the fitting;

wherein the fitting has a radius sufficient to cover the hexagonally shaped recess; and wherein the spherical intermediate is manufactured from titanium and/or surgical stainless steel.

12. A method for installing a dental implant system, the method comprising the following steps:

before application of a dental implant in a mouth of a patient, defining an angulation of a threaded hole of a spherical part according to clinical needs of the patient;

securing the dental implant into the patient's bone struc-ture thereby securing the dental implant, the implant being an internal hexagonal type implant that includes a hexagonal connection positioned at an end of the implant, the hexagonal connection forming a hexago-nally shaped recess in the end of the implant;

securing a spherical intermediate at the end of the dental implant, the spherical intermediate including a longi-tudinal axis, the spherical intermediate including:

the spherical part centrally positioned along the longi-tudinal axis, wherein the spherical part includes:

a semi-spherical upper part located above a trans-verse axis of the spherical part, the semi-spherical upper part having a threaded hole positioned either (a) coaxially with the longitudinal axis of the spherical intermediate or (b) at an angle up to 45° to the longitudinal axis, the threaded hole includ-ing a triangular key socket for a triangular wrench when the threaded hole is positioned coaxially with the longitudinal axis of the spherical inter-mediate; and a semi-spherical lower part located below the trans-verse axis; and a fitting coupled to the semi-spherical lower part, the
   fitting forming a cylinder with sufficient radius to
   cover the hexagonally shaped recess; and
a lower thread coupled to the fitting such that the fitting
   is positioned intermediate the semi-spherical lower
   part and the lower thread; and
affixing an abutment to the semi-spherical upper part of
   the spherical intermediate, thereby creating a fully
   sealed joint between the abutment and the semi-spheri-
   cal upper part, the affixing including screwing a screw
   located within the abutment into the threaded hole
   located in the semi-spherical upper part.

* * * * *